(No Model.) 2 Sheets—Sheet 1.

A. J. VENTZKI.
FEED STEAMING APPARATUS FOR ANIMALS.

No. 485,399. Patented Nov. 1, 1892.

Witnesses.
E. B. Bolton
E. K. Sturtevant

Inventor:
August Jacob Ventzki
By Richards
his Attorneys.

(No Model.) 2 Sheets—Sheet 2.
A. J. VENTZKI.
FEED STEAMING APPARATUS FOR ANIMALS.
No. 485,399. Patented Nov. 1, 1892.
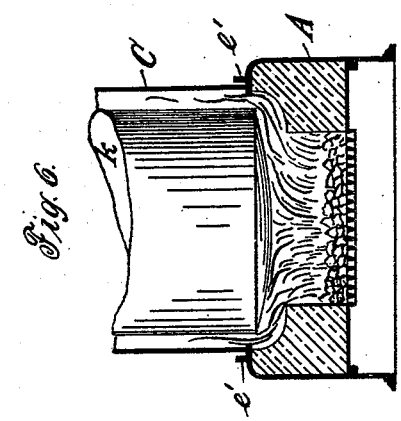
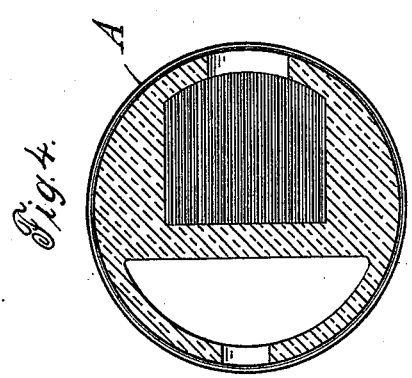
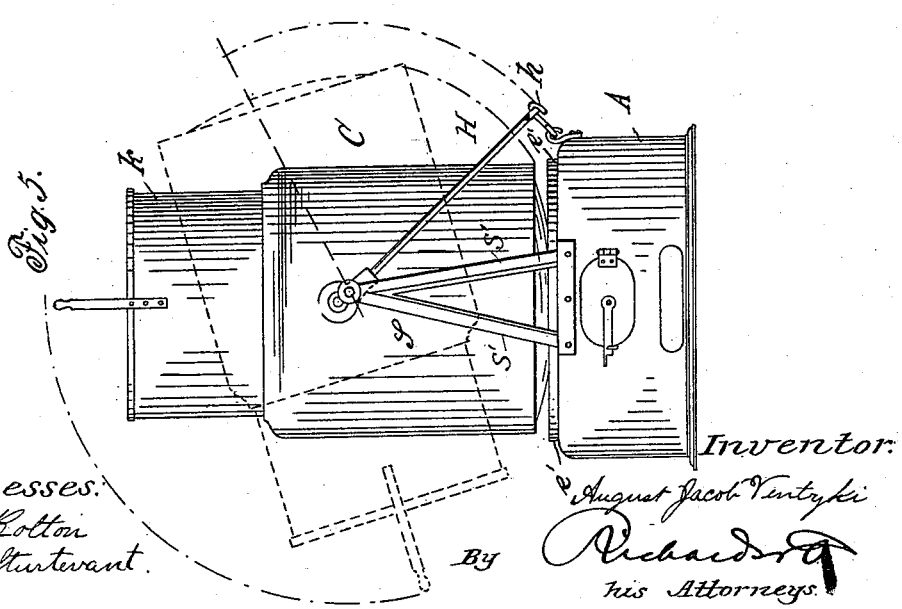
Witnesses:
C. B. Bolton
E. K. Sturtevant
Inventor:
August Jacob Ventzki
By Richards
his Attorneys.

UNITED STATES PATENT OFFICE.

AUGUST JACOB VENTZKI, OF GRAUDENZ, GERMANY.

FEED-STEAMING APPARATUS FOR ANIMALS.

SPECIFICATION forming part of Letters Patent No. 485,399, dated November 1, 1892.

Application filed February 1, 1892. Serial No. 420,003. (No model.) Patented in Germany November 28, 1889, No. 55,139.

*To all whom it may concern:*

Be it known that I, AUGUST JACOB VENTZKI, a subject of the King of Prussia, residing at Graudenz, Germany, have invented certain Improvements in Feed-Steaming Apparatus for Animals, (for which I have received Letters Patent in Germany, No. 55,139, dated November 28, 1889,) of which the following is a specification.

My invention relates to feed-steaming apparatus for animals; and it consists in the construction hereinafter described and set forth, whereby the highest effect of the heat is secured and the feed may be conveniently removed from the kettle without necessitating the detachment of the latter.

Figure 3:
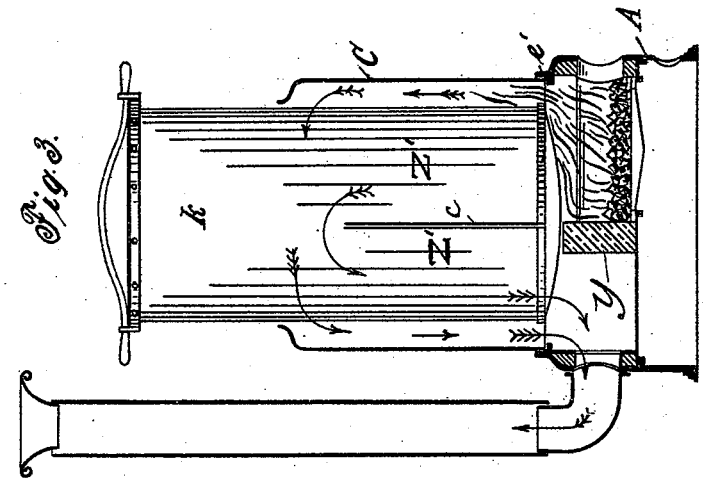
Figure 2:
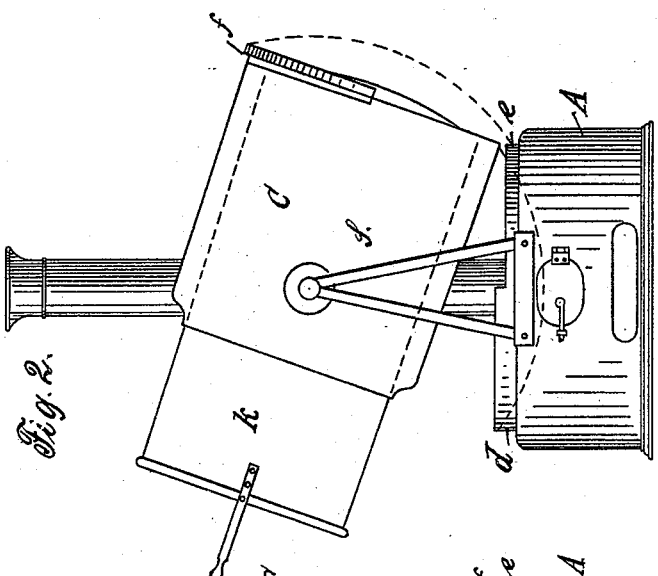
Figure 1:
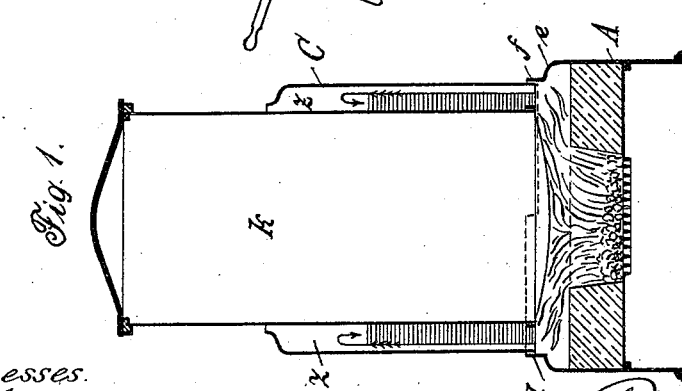

In the accompanying drawings, forming part of this specification, Figure 1 is a central vertical sectional elevation of a feed-steaming apparatus embodying my improvements. Fig. 2 is an elevation of the same, showing the kettle tilted. Fig. 3 is a central longitudinal vertical section through the fixed part of the apparatus, the kettle being shown in elevation. Fig. 4 is a horizontal sectional plan view taken in the plane of the furnace-door. Fig. 5 is a vertical section showing a modification, and Fig. 6 is a detail sectional view of the lower part of the apparatus shown in Fig. 5 and illustrating the position of the kettle within the fixed part when said kettle is not tilted.

For this purpose the stove consists of two parts—the lower part A, Figs. 1 to 4, which contains the fire, and thus forms the fireplace proper, and the heating-case C, connected tightly with the kettle $k$ in such a manner that a space $z$ is formed between the kettle and the heating-case, into which the products of combustion pass after having imparted the greater part of their heat to the bottom of the kettle. The kettle $k$ and the heating-case C are pivotally mounted in the frame S, Fig. 2. In this construction it is possible to give the kettle a large heating-surface without being forced to sink the same into a deep fireplace from which it could only be lifted with great effort. The kettle can be partly or entirely surrounded with a heating-case without losing any of the advantages of easy handling.

To obtain a tight joint between the fireplace A and the heating-case C, the latter lies to the left against a projection $d$ of the under part, Figs. 1 and 2, while an edge $f$, connected with the case C, engages with the right hand lower projection $e$. A modification of this closing between the fireplace A and the case C is shown in Figs. 5 and 6. Here the kettle, together with its casing, is set into the circular projecting edge $e'$, and both must be lifted somewhat by a well-known lever arrangement when it is to be tilted. Such a lever arrangement with which even a very heavy kettle can be easily lifted is shown in Fig. 5. On the lower part A are two opposite braces $S'$, which are the bearings of two levers H, connected with a cross-bar. The turning-pegs of the cooking-kettle rest in bearings in the short lever-arms.

When the cooking-kettle is to be emptied, the two levers H are pressed down on the connecting cross-bar and fastened by means of a little hook $h$. In this position the cooking-kettle is raised so far from the edge $e'$ that it hangs free and can be turned over without striking the under part.

Other kettle-supporting arrangements or mechanisms can be used without changing the nature of the invention—that is, the dividing of the fireplace and the heating-case.

By reference to Figs. 1 and 3, it will be seen that the kettle K is provided at its sides with diametrically-opposite plates $c$, forming partitions for the case C, and which cause the products of combustion to ascend in contact with the front half of the kettle and also descend in contact with the rear half thereof, said products escaping through the discharge-flue communicating with the fixed lower part.

The stove has an interior wall $y$, Fig. 3, which is directly below the plates $c$, and thus forms a continuation thereof, forming, with said plates, the circulation-passage $z'$, extending over the plates, thence down into the stove-case and out at the rear thereof. The kettle, with its casing, forms a closure for the open-top stove when in upright position.

Having now particularly described and ascertained the nature of my said invention and in what manner the same is to be performed, I declare that what I claim is—

1. In combination, in a feed-steamer, the stove open at the top, the kettle having a closed bottom, the heating-case carried by the kettle and forming a space $z$, said casing being open at the bottom and having its space communicating with the open stove, the pivotal support for the kettle, and the flanged joint between the kettle and the stove, said kettle forming a closure for the stove by the flanged joint and arranged to be tilted, substantially as described.

2. In combination, the stove having an open top with the interior wall $y$, the kettle having the closed bottom, the heating-case about the stove, forming a space $z$, which communicates with the open-top stove, and the plates $c$ on the opposite sides of the kettle, said plates being in line with the wall $y$ and forming therewith the circuitous passage $z'$, said case, with its kettle, being arranged to be tilted and forming a closure for the stove when it is in upright position, substantially as described.

3. In combination, the stove, the kettle having the casing open at its lower end and communicating with the stove, the supporting-frame, and the means for raising and lowering the kettle from and to its seat, consisting of the levers H, pivoted in the frame and carrying the bearings of the kettle at one end, said kettle having pivotal movement on the said bearings, and the means for locking the lever H in its lowest position, substantially as described.

In witness whereof I have hereunto set my hand in presence of two witnesses.

AUGUST JACOB VENTZKI.

Witnesses:
ALFRED PAUL MUKATE,
ERNST GERSDORFF.